Dec. 1, 1953     W. G. DURANT     2,660,865
REFRIGERATION AND AIR CONDITIONING EQUIPMENT
Filed March 6, 1950     4 Sheets-Sheet 1
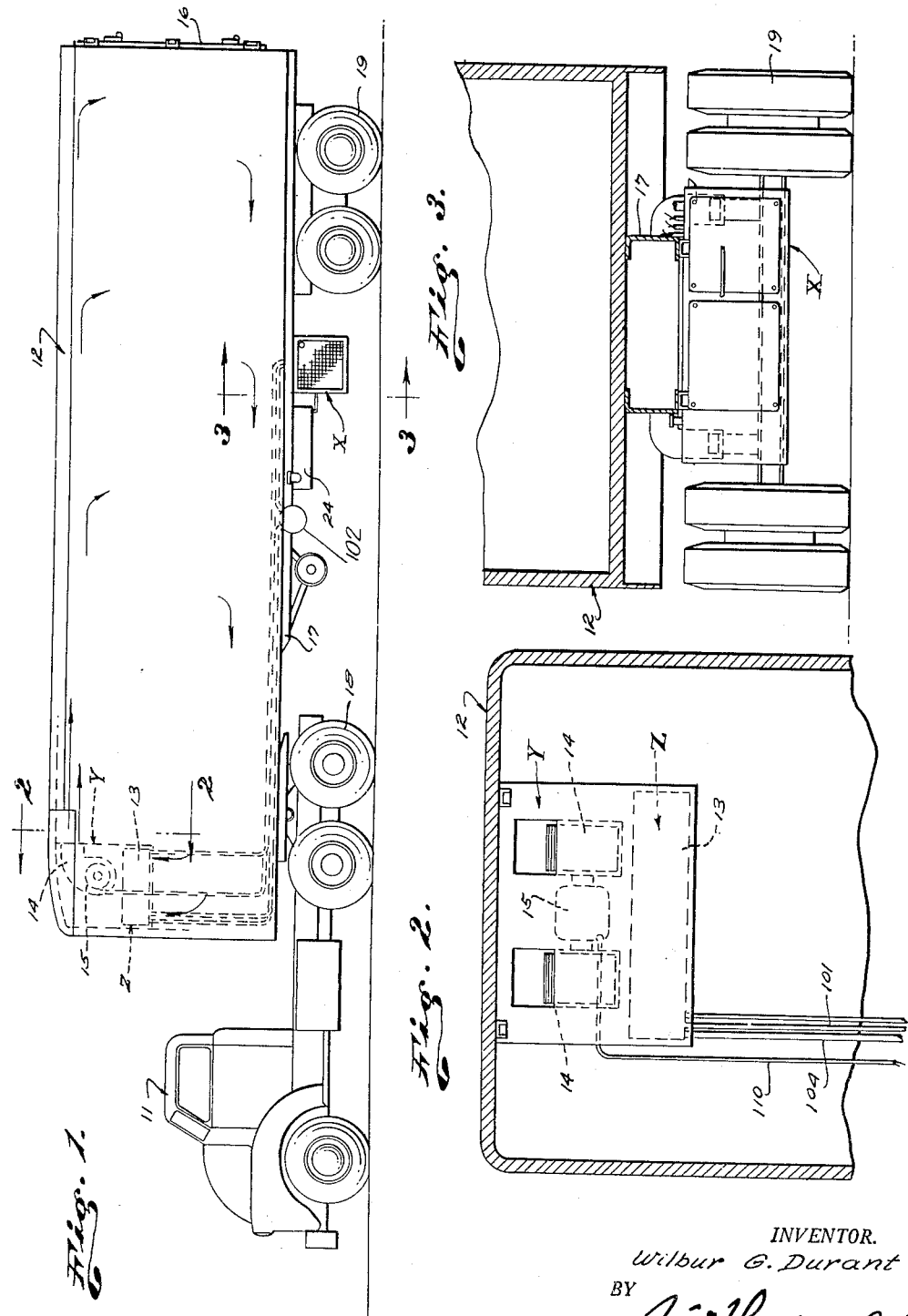
INVENTOR.
Wilbur G. Durant
BY
Attorney

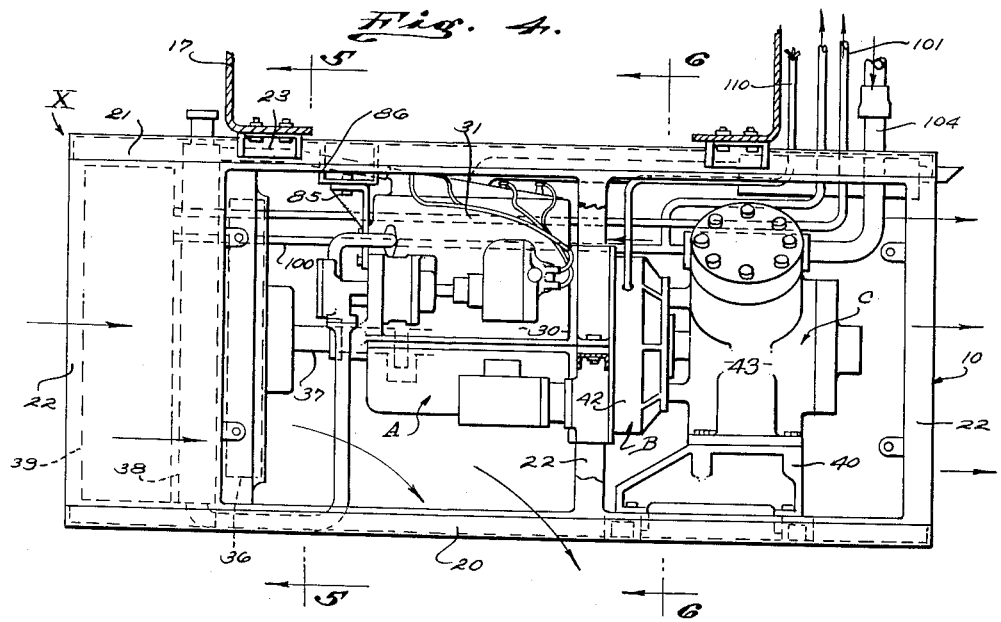
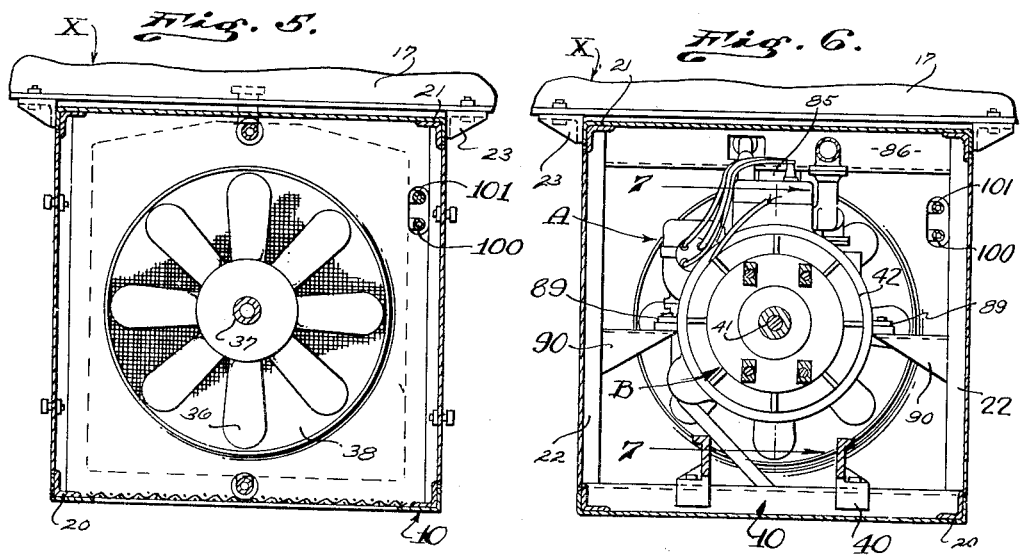

Dec. 1, 1953  W. G. DURANT  2,660,865
REFRIGERATION AND AIR CONDITIONING EQUIPMENT
Filed March 6, 1950  4 Sheets-Sheet 3
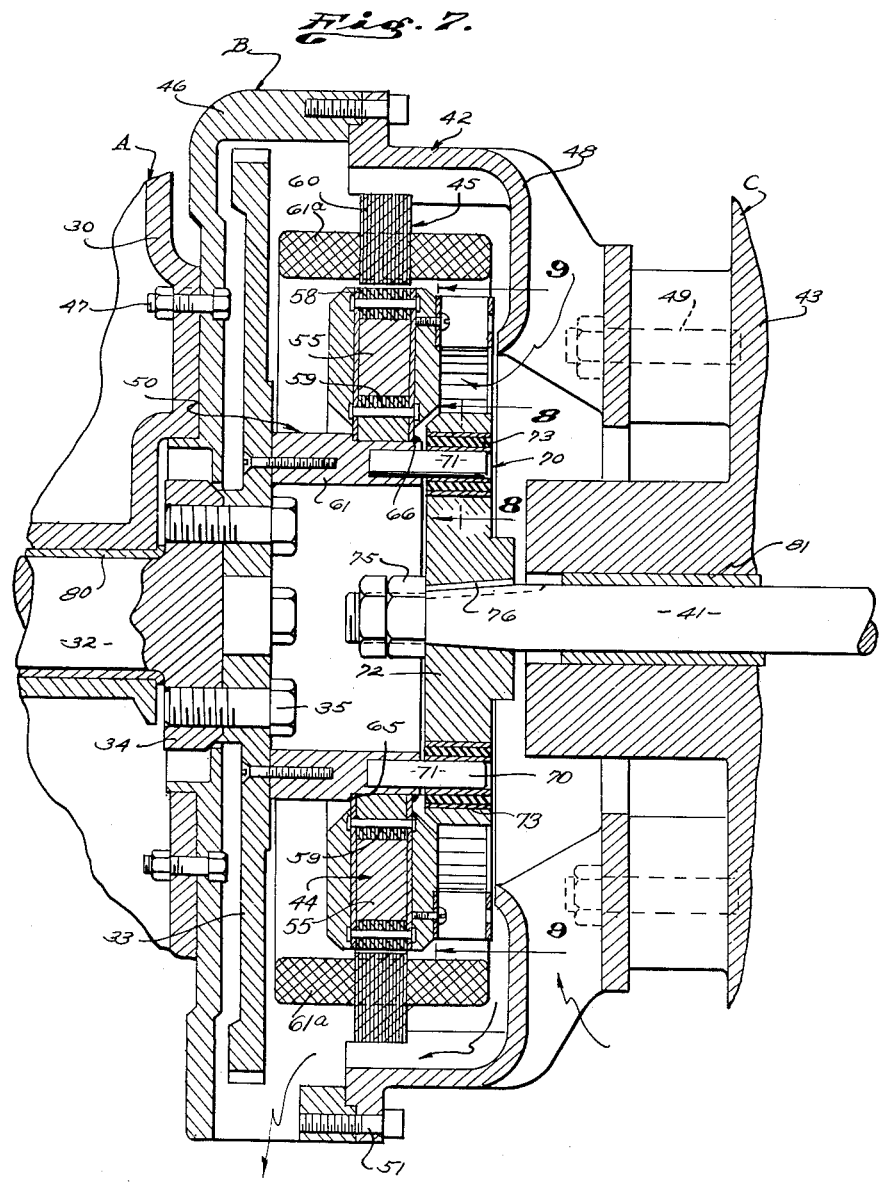
INVENTOR.
Wilbur G. Durant
BY
Attorney Dec. 1, 1953 W. G. DURANT 2,660,865
REFRIGERATION AND AIR CONDITIONING EQUIPMENT
Filed March 6, 1950 4 Sheets-Sheet 4
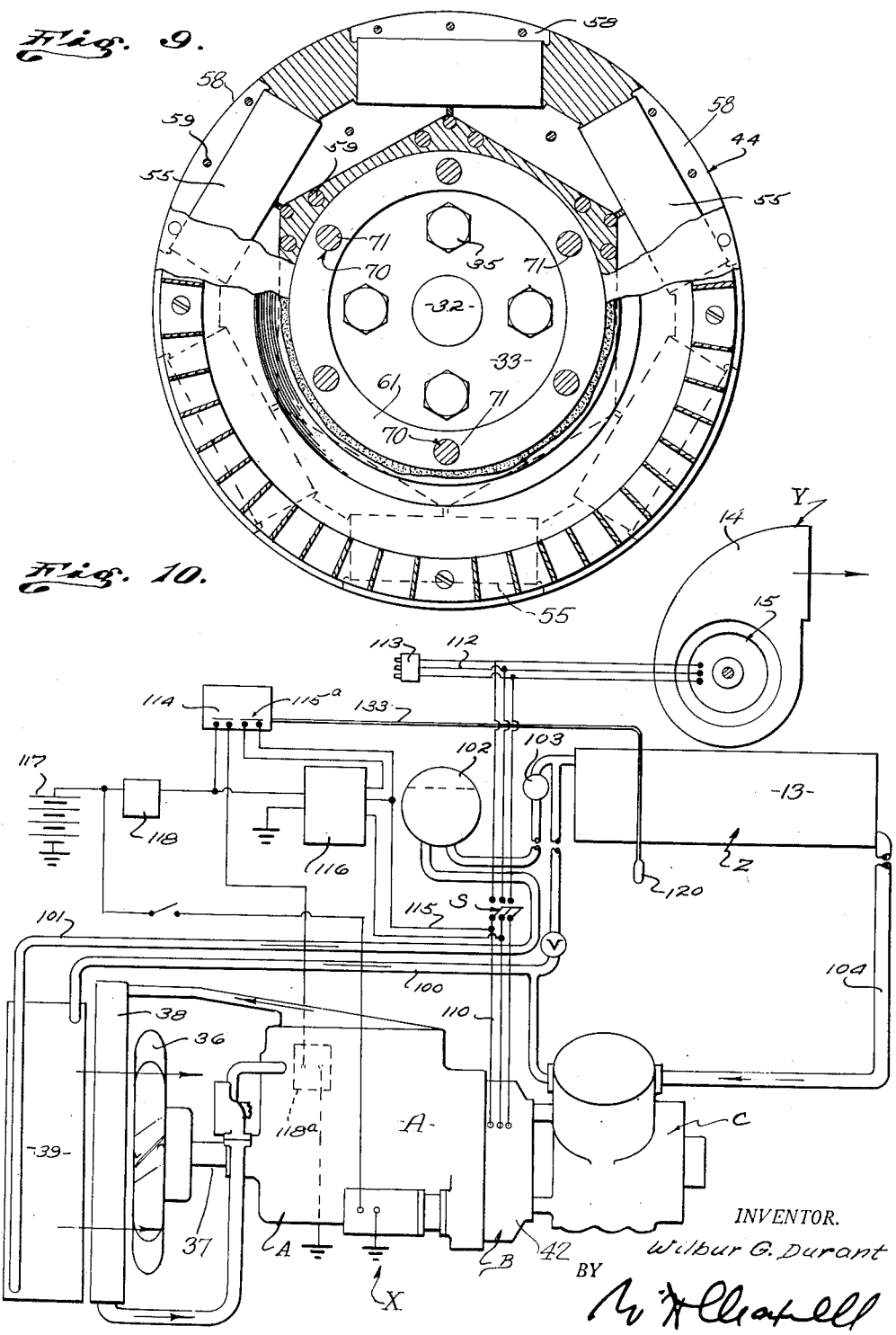
INVENTOR.
Wilbur G. Durant
BY
Attorney Patented Dec. 1, 1953

2,660,865

UNITED STATES PATENT OFFICE 2,660,865

REFRIGERATION AND AIR CONDITIONING EQUIPMENT

Wilbur G. Durant, Pasadena, Calif., assignor, by mesne assignments, to Transicold Corporation, Los Angeles, Calif., a corporation of California Application March 6, 1950, Serial No. 147,778

8 Claims. (Cl. 62—117.1)

This invention is concerned with refrigeration and air conditioning equipment, and it is a general object of the invention to provide simple, practical, dependable equipment suitable for use where a desired temperature is to be established and maintained and where air is to be circulated, as for instance, in a refrigerated area.

The present invention is concerned with that class or type of refrigeration equipment wherein a prime mover, for example, an internal combustion engine, is employed to operate refrigerating machinery and where it is desired that air be circulated or that other or auxiliary equipment be operated. An example of such a situation occurs where it is desired to refrigerate or air condition a vehicle such as a motor vehicle or a rail vehicle. There are many cases where such vehicles are desired to be refrigerated and thus require refrigeration machinery to be operated, usually by independent prime movers, and in the case of such equipment it is often desirable that the air in the refrigerated space or compartment be maintained in motion, as by one or more fans or blowers. Refrigeration equipment usually employed for this type of service involves a compressor driven by an engine and a means for driving a suitably located fan or blower. This type of equipment is usually characterized by various drives involving shafts or joints, or both, for instance belt drives, and is cumbersome and complicated so that its mounting is difficult and limited and its service is not altogether satisfactory or dependable. Where electric drives are provided, they generally involve belt driven equipment and are limited to constant speed operation due to the generation of current for field excitation. Furthermore such systems usually involve complicated control equipment.

It is a general object of this invention to provide refrigeration equipment wherein there is a group or assembly of elements involving a prime mover such as an internal combustion engine, a compressor which handles refrigerant, and an electrical generator, which elements operate in synchronism and as a unit, the generator having a permanent magnet rotating field which is capable of supplying energy suitable for operation of fans or blowers even though the equipment is operated at various speeds.

A further object of this invention is to provide equipment of the general character referred to characterized by a unitary assembly which is simple in form, compact, dependable, and highly effective, which assembly involves an internal combustion engine and a refrigerant compressor and an electrical generator interposed between the engine and the compressor. In the arrangement provided by the invention, the working or rotating part of the compressor and the rotor of the generator are in line with and directly driven by the rotating element or shaft of the engine.

The equipment provided by the present invention involves a frame of simple regular form suitable for convenient mounting on a vehicle, preferably at the exterior thereof. The frame carries certain principal parts, namely, a prime mover, preferably in the form of an internal combustion engine, a compressor handling refrigerant, and an electric generator which is disposed between and which couples the engine and compressor. Other or auxiliary equipment is also carried by the frame and may include a radiator handling coolant for the engine and an air cooled condenser handling the refrigerant as it is delivered by the compressor.

The generator is of the permanent magnet type and therefore operates to deliver a supply of current suitable for operating fan or blower motors, even though its speed of operation may vary widely as the compressor is operated in a manner to maintain the desired supply of refrigerant. In the preferred form of the invention, suitable air moving or handling equipment is provided and is suitably related to the power assembly. The air handling equipment ordinarily involves one or more electric motors operating one or more suitable fans or blowers. The motor of such air moving equipment is coupled with the permanent magnet generator by a suitable current carrying cable making it possible to locate the air handling equipment remote from the prime mover and generator just as the expander, or refrigerant handling unit supplied by the compressor may be located remote from the compressor. In a typical and practical installation where the equipment is provided for refrigerating a motor vehicle such as a truck or trailer or combination of truck and trailer, etc., the prime mover, generator and compressor may be located in any suitable or convenient manner, preferably at the exterior of the body to be refrigerated, while the refrigerant expander or refrigerant handling unit receiving refrigerant from the compressor may be located in such body.

It is another object of this invention to provide a simple, compact, dependable construction coupling a prime mover such as an internal combustion engine and a refrigerant compressor by means of or through an electrical generator, so that the construction is made simple and inexpensive of manufacture, simple and convenient to assemble, and such that it involves but few simple, dependable parts. With the construction provided by the present invention bearings provided to handle the shafts of the engine and compressor are the only shaft bearings required, in that the rotor of the generator is employed as a coupling between the shafts of the engine and compressor in such manner that this element of the generator does not require any independent or special support and is therefore entirely without the usual rotor bearings.

The various objects and features of my invention will be fully understood from the following detailed description of a typical preferred form and application of the invention, throughout which description reference is made to the accompanying drawings, in which:

Fig. 1 is a side elevation of a typical cargo-carrying vehicle having equipment provided by the present invention, the particular vehicle illustrated being a motor vehicle in which a cargo carrying body is propelled by a traction unit. Fig. 2 is an enlarged detailed sectional view taken substantially as indicated by line 2—2 on Fig. 1. Fig. 3 is an enlarged detailed transverse sectional view taken substantially as indicated by line 3—3 on Fig. 1. Fig. 4 is an enlarged side elevation of the equipment shown in Fig. 3 as applied to the frame of the vehicle to depend therefrom, the cover plates being removed so that the various essential units of the equipment are shown located in the frame by which they are attached to the vehicle. Fig. 5 is a detailed transverse sectional view taken as indicated by line 5—5 on Fig. 4. Fig. 6 is an enlarged detailed transverse sectional view taken as indicated by line 6—6 on Fig. 4. Fig. 7 is an enlarged longitudinal sectional view taken through the generator and showing the manner in which the generator couples the engine and compressor. Fig. 8 is an enlarged detailed sectional view taken as indicated by line 8—8 on Fig. 7. Fig. 9 is a detailed view taken as indicated by line 9—9 on Fig. 7, with certain parts broken away to illustrate details of construction, and Fig. 10 is a diagrammatic view illustrating the various elements of the apparatus and showing the manner in which they may be connected.

Since the refrigerating and air conditioning equipment provided by this invention is particularly useful and practical as applied to or as used in connection with a cargo carrying motor vehicle such, for example as a truck, I have illustrated it in a form suitable for this type of service and have shown it as applied to a typical or conventional cargo carrying motor vehicle. It is to be understood, of course, that the invention can be used to advantage on or in connection with cargo carriers generally, and it is highly practical as applied to various wheeled vehicles such as railroad rolling stock, and motor vehicles generally, including various forms or types of cargo-carrying vehicles generally classified as trucks.

The invention provides, generally, what I will refer to as a power assembly and an air handling assembly, and also a refrigerant handling unit. In the drawings the power assembly is illustrated at X, the air handling assembly is illustrated at Y and the refrigerant handling unit is illustrated at Z.

The power assembly is characterized, generally, by a frame 10 supporting a prime mover in the form of an internal combustion engine A, an electrical generator B and a refrigerant compressor C. In the particular case illustrated, the frame 10 is shown as a structure or unit formed independently of the motor vehicle and is applied thereto in a suitable manner and at a suitable location where it does not interfere with other parts or equipment nor with free handling or use of the vehicle. In the particular case illustrated, the air handling assembly Y and the refrigerant handling unit Z, are both located in the box-like body 12 of the vehicle where they operate to cool the space or chamber established by the body and to maintain proper circulation of air within such space. The refrigerant handling unit Z is shown as involving a simple or conventional expander 13 while the air handling unit Y is shown as involving suitable blowers 14 operated by an electric motor 15. In the particular case illustrated, the body 12 of the vehicle is supported on a suitable frame 17 having front and rear supporting wheels 18 and 19, the front supporting wheels 18 being common to a draft unit 11. The power assembly X provided by the present invention is shown mounted beneath the body 12 between the wheels 18 and 19, the frame 10 of the power assembly being attached to the frame 17 of the vehicle.

The frame 10 may vary widely in form and construction. In a typical case, such as is illustrated, the frame 10 may be an open cell-like structure involving bottom beams 20, top beams 21 and suitable posts or uprights 22. The several elements of the frame are preferably joined together to form a rigid unitary structure and, in practice, the frame may be advantageously secured to a part of the vehicle such as the frame 17 thereof by simple brackets 23 or the like.

The prime mover A, which is preferably a conventional internal combustion engine supplied with fuel from a tank 24 suitably located on the vehicle, is carried in the frame 10, preferably about midway between the ends of the frame. The particular engine illustrated involves a suitable case or housing 30 supporting a cylinder block 31 and a shaft 32. A flywheel 33 is carried on the rear end of shaft 32 at the exterior of the housing 30 and is shown releasably joined to a flange 34 of the shaft 32 by annular series of screw fasteners 35. An air circulating fan 36 is located in the frame forward of the engine and is driven by a forward extension 37 of the engine shaft 32. In accordance with the preferred arrangement provided by the present invention, a radiator 38 and a refrigerant cooler or condenser 39 are carried by the frame 10 in front of the fan 36. The radiator 38 carries the coolant employed by the engine A while the refrigerant cooler receives the refrigerant delivered by the compressor C. In the preferred arrangement, the radiator 38 is located between the refrigerant condenser 39 and fan 36, as clearly shown in Fig. 4 of the drawings.

The compressor C is shown as a typical or conventional compressor employed for handling a suitable refrigerant for a system of the character with which this invention is concerned. The compressor is shown supported from the bottom beams 20 of the frame 10 by means of a base 40 so that it is rigidly supported in the frame with its shaft 41 concentric with the shaft 32 of engine A.

The electrical generator B is located between and couples the engine A and the compressor C, and in its preferred form it involves, generally, a casing 42 that connects the housing 30 of engine A and the housing 42 of compressor C, a rotor 44 driven by the engine and a stator 45 carried by the case 42.

The case 42 is preferably of sectional construction, and in the case illustrated, it involves an engine section 46 which is fixed to the case 30 of the engine, as by suitable fasteners 47, and a compressor section 48 which is fixed to the case 43 of the compressor, as by suitable fasteners 49. The engine section 46 of case 42 encloses or houses the flywheel 33 of the engine, while the compressor section 48 carries or supports the stator 45 which surrounds the rotor 44. A suitable mounting means 50 supports the rotor 44 of the generator within the stator so that it is concentric with the shafts 32 and 41 and is driven by the shaft of the engine. The sections 46 and 48 of the generator case 42 are suitably secured or joined together as by fasteners 51.

In accordance with the present invention, the generator B is of the permanent magnet type, and the rotor 44 of the generator is characterized by an annular series of permanent magnets 55. To provide a rotor in the nature of a field established by permanent magnets and having sufficient strength or capacity and which is of substantial diameter, I preferably provide an annular series of permanent magnets 55 involving six magnets of limited size, rather than fewer large magnets such as generally characterize permanent magnet generators of this general character.

In practice, I may construct the rotor 44 of the generator in any suitable manner. In the case illustrated, the rotor is shown as involving the permanent magnets 55 suitably related to pole pieces 58, and the various elements entering into the rotor are secured or tied together to form a permanent assembly by means of a plurality of suitable couplings or ties 59. It is to be understood that the present invention is not to be considered limited to any particular rotor construction in the generator, and that in practice any rotor construction of the general type illustrated in the drawings may be used to advantage.

The stator 45 of the generator is shown suitably supported in the compressor section 48 of the generator case and it is shown as involving, generally, suitably related laminations 60 and windings 61ª forming an annular structure that surrounds the rotor 44 with suitable working clearance.

The mounting means 50 provided by the present invention supports the rotor 44 concentrically with shaft 32 and in the preferred form of the invention, it is in the form of an annular or tubular core 61 having one end joined or fixed to the flywheel 33 of the engine to be concentric therewith. A feature of the structure is the formation of the core 61 so that its inside diameter is greater than the diameter of the series of fasteners 35 joining the flywheel 33 to the shaft 32 thus making it possible to reach the fasteners 35 through the other or outer end of the core 61 when the casing sections of the generator are separated and the engine and compressor are moved apart far enough so that a suitable tool can be introduced through the core to the fasteners 35. In the preferred form of the invention, the core 61 is permanently or integrally joined to the flywheel 33 as by brazing, welding, or other suitably means, so that it is, in effect, a part thereof. It will be apparent from Fig. 7 of the drawings, how the rotor 44 of the generator may be mounted on the exterior of the core 61 or against a flange 65 on the core so that it is properly located axially. The rotor may be secured on the core 61 in any suitable manner as, for instance, by welding 66, or the like.

The present invention provides a coupling means 70 between the engine A and compressor C and in the preferred form of the invention, the coupling means acts through or is connected with the mounting means 50, just described. In the form of construction illustrated, the coupling means 70 involves pins 71 projecting from the outer end of the core 61 so that they are parallel with the axis of the core and therefore with the shafts 32 and 41. A drive flange 72 is fixed on the projecting end of the compressor shaft 41 and drive bushings 73 are carried in the flange and receive the pins. In the particular case illustrated, the flange 72 is retained on the shaft 41 by threaded retainers 75 and is keyed thereto by a suitable driving key 76. The drive bushings 73 are preferably rubber or rubber-like bushings suitably mounted in openings provided in the drive flange 72, the bushings being provided with openings which receive the projecting pins 71 as clearly shown in Fig. 7 of the drawings.

Through the construction just described, as the motor or engine operates, the shaft 32 rotates carrying with it the rotor 44 of the generator and the shaft 41 of the compressor. It is significant to observe that through the construction that I have provided, the engine bearings 80 and compressor bearings 81 are the only bearings required to support the rotating assembly, there being no separate or individual bearings required to support the rotor of the generator. This feature not only simplifies construction and reduces cost but it makes for a very simple compact construction which is highly important where space is at a premium.

In accordance with the preferred form of the invention, the rigid assembly involving the prime mover A, the generator B and the compressor C is maintained in the desired position in the frame 10 by the base 40 which supports the compressor and a mounting bracket 85 provided at the forward end of the engine and attached to a suitable cross member 86 of frame 10. It has been found, in practice, that these two supports or supporting means are effective and adequate for carrying the assembly of principal parts. In the particular case illustrated, an intermediate support is provided so that the engine A will remain in place in the frame when the sections of the generator case are separated and the compressor C moved away from the engine. In the construction illustrated, lugs 89 are provided on the sides of the engine section of the generator and rest on brackets 90 provided on suitably located uprights 22 of the frame 10.

In a preferred or typical installation; a delivery line 100 extends from the compressor C to the cooler or condenser 39 at the forward end of the frame 10. A refrigerant line 101 extends from the condenser 39 to the expansion unit Z and in accordance with the usual practice, a suitable accumulator 102 and expansion or control valve 103 may be included in this line. A refrigerant return line 104 extends from the unit Z to the compresor.

Main power lines 110 carry the output from the generator B to the motor 15 of the air handling unit Y through a suitable control switch S. In accordance with the invention, an emergency extension or connection 112 is provided in connection with the main power line 110 and is preferably equipped with suitable connecting means such as a plug 113 which enables the line 110 to be coupled with any ordinary source of electrical energy such as a lighting circuit, so that the motor 15 can be operated even though the generator B may not be in service. In practice, various power take-offs may be provided from line 110 to operate desired or necessary auxiliary equipment. In the case illustrated, a power take-off line 115 is shown extending to a suitable transformer 116 supplying energy to a control system hereinafter described and to a storage battery 117 through a suitable rectifier 118. The battery 117 may be employed to energize the electrical system of the engine A through connections common to equipment of this character.

In practice, a suitable control system is provided in connection with the various parts hereinabove described. In the particular case illustrated, the control system operates to control the engine A so that it operates automatically at either one of two different speeds. The system is such that when it is desired to build or establish the desired refrigerating atmosphere in the body 12 of the vehicle, the engine A is operated at high speed, whereas when it is merely necessary to maintain a refrigerated condition, the engine A is oprated at a normal or low speed. For the purpose of this control, a thermostat 120 is provided in the body 12 and a line 133 connects the thermostat with a control unit involving selector switches 114 and 115ª. The switches 114 and 115ª control circuits from the transformer 116 and connect with an electric throttle control 118ª provided at the engine A. The parts are designed and related so that when switch 114 is opened, in response to the thermostatic unit 120, the throttle of the engine A is set so the engine operates at high speed, whereas when switch 114 is closed the throttle of the engine is set so that the engine operates at a low speed. When switch 114 is opened, switch 115ª is also opened so that when the engine operates at high speed, the transformer delivers a desired voltage, whereas when the switch 114 and 115 are closed an the engine operates at low speed, the transformer is regulated to deliver the same desired voltage.

As a typical example of a practical application of the present invention, the rotor of the generator is provided with six poles or permanent magnets, and when the engine A is operated at a high speed, namely at 1800 R. P. M., the generator delivers 90 cycle current, and the general design may be such that the generator under this condition, delivers about 300 volts. Under such condition, the motor 15 of the air handling unit will operate at a high speed causing maximum circulation of air in the body of the vehicle and the compressor C will operate at high speed and thus deliver a maximum quantity of refrigerant to the refrigerant handling unit Z so that a maximum refrigerating effect is gained. When the engine is operated at a normal or low speed, say 1200 R. P. M., the current developed will be 60 cycle and the voltage about 220. It is preferred to employ an ordinary three-phase induction motor as the motor 15 for operating the blower, such motor being designed for 60 cycle 220 volt operation. This is highly desirable, as it makes it possible whenever the generator B is out of service for any reason whatsoever, for the blower motor to be operated by merely connecting an ordinary power line to the emergency connection 112 as through the plug 113. An ordinary power line employed for light or other ordinary domestic service will satisfactorily operate the motor 15, and in the case of an emergency, if the motor 15 can be operated, any suitable refrigerant, as for instance, ice or Dry Ice, can be introduced into the compartment 12 and the air therein suitably maintained in circulation so that the cargo is maintained at the desired temperature.

From the foregoing description, it will be apparent that the present invention provides a power unit wherein an engine and compressor are effectively and dependably coupled in a compact arrangement through a simple compact generator and through a construction which involves but few simple parts, which is inexpensive of manufacture and which is convenient to service and maintain in proper operating condition. The power unit provided by the present invention is wholly without belts, chains, and the various complicated drives and power connections usual to this type of equipment and it is consequently free of the troubles and complications that attend the usual equipment of this general character.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. Refrigerating apparatus of the character described including, a prime mover including a housing and a rotating element projecting from the housing, a refrigerant handling unit, a refrigerant compressor supplying refrigerant to the said unit and operated by the prime mover, an electric generator operated by the prime mover and in synchronism with the compressor and including a case attached to the housing of the prime mover and a rotor attached to said element, said housing and said case being located at adjacent ends of the prime mover and compressor, respectively, and enclosing said generator, an air circulator, and an electric motor driving the circulator and operated by current from said generator, the prime mover, generator and compressor being arranged as a compact unit and in axial alinement, with the generator positioned between and operatively coupling the prime mover and compressor.

2. Apparatus of the character described including, a prime mover having a housing at one end thereof and a projecting drive shaft at said one end, a compressor having a housing at one end thereof and adjacent the housing of said prime mover and having a rotating part projecting therefrom, and an electrical generator having a case connected to and joining said housings and a rotor within the case and supported solely by means of the drive shaft to operate therewith said prime mover, generator, and compressor being arranged as a compact unit and in axial alinement, with said case and the generator therein positioned between said prime mover and compressor, and said generator operatively coupling the said projecting drive shaft and said rotating part.

3. Apparatus of the character described in claim 2, in which the case of the generator includes two separable sections one joined to the housing of the prime mover and the other joined to the housing of the compressor.

4. Apparatus of the character described including, a prime mover having a housing at one end thereof and a projecting drive shaft at said one end, a compressor having a housing at one end thereof, and adjacent the housing of said prime mover and having a rotating part projecting therefrom at said one end, an electrical generator positioned between said prime mover and said compressor and having a case connected to and joining said housings and having a rotor within the case and supported solely by means of the drive shaft to operate therewith, said prime mover, generator, and compressor being arranged as a compact unit and in axial alinement, and a drive from the rotor to the said rotating part of the compressor, the rotor including an annular core concentric with the shaft and connected thereto and the drive including a member projecting from the core and an element on said part and engaged by said member whereby said prime mover is operatively connected to said compressor by said generator.

5. Apparatus of the character described including, a prime mover having a housing at one end thereof and a projecting drive shaft with a flywheel thereon at said one end, a compressor having a housing at one end thereof and adjacent the housing of said prime mover and having a rotating part projecting therefrom at said one end, and an electrical generator positioned between said prime mover and said compressor and having a case connected to and joining said housings and having a rotor within the case and supported solely by means of the drive shaft to operate therewith, the rotor including a core attached to the flywheel and projecting therefrom axially of the shaft, and means connecting said core with the rotating part of said compressor, whereby said prime mover is operatively coupled to said compressor to drive the same.

6. Apparatus of the character described including, a prime mover having a housing at one end thereof and a projecting drive shaft at said one end, a flywheel, means central of the flywheel and shaft releasably attaching the flywheel to the shaft, a compressor having a housing at one end thereof and adjacent the housing of said prime mover and having a rotating part projecting therefrom at said one end, and an electrical generator having a case connected to and joining said housings and having a rotor within the case and supported solely by means of the drive shaft to operate therewith, the rotor including an annular core with one end attached to the flywheel concentrically therewith and projecting therefrom toward the compressor and having releasable driving engagement with said part of the compressor, the core being open and providing access to said means when the said part of the compressor is released from the core and removed therefrom, and means connecting said core with the rotating part of said compressor, whereby said prime mover is operatively coupled to said compressor to drive the same.

7. A unit of the character described including, an engine having a housing at one end thereof, a shaft projecting from the housing at said one end, a flywheel, and means at the central portion of the flywheel releasably coupling the flywheel to the projecting portion of the engine shaft, a compressor having a housing at one end thereof and adjacent the housing of said prime mover and having a rotating part projecting therefrom at said one end, an electrical generator positioned between said prime mover and said compressor and including a case releasably connected to the housing of the engine and to the housing of the compressor, an annular stator carried in the case, and a rotor within the stator and having an annular core fixed to the flywheel concentric therewith and surrounding said means, and a drive connection from the core of the rotor to said part of the compressor, whereby said prime mover is operatively coupled to said compressor to drive the same.

8. A unit of the character described in claim 7 in which the drive connection from the core of the rotor to said part of said compressor includes a flange on said part, pins projecting from the core, and bushings carried by the flange and receiving said pins.

WILBUR G. DURANT.

References Cited in the file of this patent

UNITED STATES PATENTS

| Number | Name | Date |
|---|---|---|
| 2,077,974 | Wishart | Apr. 20, 1937 |
| 2,104,383 | Candor et al. | Jan. 4, 1938 |
| 2,248,654 | Ballou, Jr. | July 8, 1941 |
| 2,251,376 | Ross | Aug. 5, 1941 |
| 2,258,503 | Vollenweider | Oct. 7, 1941 |
| 2,341,781 | Hornaday | Feb. 15, 1944 |
| 2,388,210 | Hanson et al. | Oct. 30, 1945 |
| 2,407,883 | Jackson | Sept. 17, 1946 |